United States Patent
Firley et al.

(10) Patent No.: US 6,636,988 B1
(45) Date of Patent: Oct. 21, 2003

(54) APPLICATION OF AUTOMATION AND PROCEDURES TO ENABLE HIGH-SPEED RECOVERY AND RELOCATION OF COMPUTER WORKLOADS

(75) Inventors: Mark J. Firley, Gaithersburg, MD (US); Roland Foster, Gaithersburg, MD (US); Steven R. Owen, Ellicott City, MD (US); Robert G. Warner, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/517,733

(22) Filed: Mar. 3, 2000

(51) Int. Cl.$^7$ ................................................. H02H 3/05
(52) U.S. Cl. ................ 714/15; 714/3; 714/46
(58) Field of Search ................ 714/3, 46, 48, 714/15; 709/105

(56) References Cited

U.S. PATENT DOCUMENTS

| | | | | |
|---|---|---|---|---|
| 4,592,053 A | * | 5/1986 | Matsuura | 228/147 |
| 5,930,824 A | | 7/1999 | Anglin et al. | |
| 6,021,262 A | * | 2/2000 | Cote et al. | 714/48 |
| 6,092,085 A | | 7/2000 | Keene | 707/202 |
| 6,122,746 A | * | 9/2000 | Nouri et al. | 713/310 |
| 6,144,999 A | | 11/2000 | Khalidi et al. | |
| 6,202,160 B1 | * | 3/2001 | Sheikh et al. | 713/310 |
| 6,347,375 B1 | * | 2/2002 | Reinert et al. | 713/200 |
| 6,377,959 B1 | * | 4/2002 | Carlson | 707/202 |
| 6,425,006 B1 | * | 7/2002 | Chari et al. | 709/224 |
| 6,438,716 B1 | * | 8/2002 | Snover | 714/57 |

FOREIGN PATENT DOCUMENTS

WO    WO 95/23376    8/1995

* cited by examiner

*Primary Examiner*—Scott Baderman
*Assistant Examiner*—Joshua Lohn
(74) *Attorney, Agent, or Firm*—Scully, Scott, Murphy & Presser; William E. Schiesser

(57) ABSTRACT

A method and system for enabling high-speed recovery and automation of computer workloads. The method comprises the steps of expressing requirements for a computer system and associated networking and peripherals, allowing a customer to specify a recovery instruction, processing the recovery instruction at a recovery site, and using a computer to process the recovery instruction to assign resources at the recovery site to reconfigure the computer system. Preferably, the expressing step includes the step of using a resource definition language to express the requirement of the computer system. The recovery instruction may include process definitions, system control program information, peripheral requirements, networking information, channel extension capabilities and tape vaulting information. Preferably, the computer is used to analyze, map, reconfigure recovery hardware and begin restoration of the customer to a recovery configuration.

15 Claims, 4 Drawing Sheets

AMFGT - Server Getfiles Task

APPLICATION OF AUTOMATION AND PROCEDURES TO ENABLE HIGH-SPEED RECOVERY AND RELOCATION OF COMPUTER WORKLOADS

REFERENCE TO COMPUTER PROGRAM LISTING

The file of this patent includes two, identical sets of compact discs containing Appendices D–Q, which are herein incorporated by reference in their entireties. Each set includes two compacts discs. Appendix 1 contains a complete list of the files on these compact discs including their names, sizes in bytes and dates of creation.

These computer listings contain material which is subject to copyright protection. The copyright owner has no objection to the facsimile reproduction by anyone of the patent document of the patent disclosure, as it appears in the Patent and Trademark Office patent file or records but otherwise reserves all copyright rights whatsoever.

BACKGROUND OF THE INVENTION

This invention generally relates to the recovery and relocation of computer workloads. More specifically, the invention relates to methods and systems using high speed, automated procedures for this purpose.

For various reasons, it may be necessary or desirable to recover or reconfigure computer systems or computer workloads. For instance, natural disasters, such as a flood or hurricane, may do substantial damage to a computer system or a computer network. If the system is complex, reconstructing the system may be difficult and time consuming. Attempts have been made to automate or simplify the recovery or reconfiguration process, but these attempts have not passed beyond simple addressing layouts.

SUMMARY OF THE INVENTION

An object of this invention is to enable high-speed recovery and relocation of computer workloads.

Another object of the present invention is to use a definition language for the expression of requirements for computer systems and associated networking and peripherals.

A further object of this invention is to improve productivity for business continuity and recovery services personnel involved in the management and support of customer recoveries and tests in the server environment.

These and other objectives are attained with a method and system for enabling high-speed recovery and automation of computer workloads. The method comprises the steps of expressing requirements for a computer system and associated networking and peripherals, allowing a customer to specify a recovery instruction, processing the recovery instruction at a recovery site, and using a computer to process the recovery instruction to assign resources at the recovery site to reconfigure the computer system.

Preferably, the expressing step includes the step of using a resource definition language to express the requirement of the computer system. The recovery instruction may include process definitions, system control program information, peripheral requirements, networking information, channel extension capabilities and tape vaulting information. Preferably, the computer is used to analyze, map, reconfigure recovery hardware and begin restoration of the customer to a recovery configuration.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The present invention, generally, is a method and system to record requirements, analyze system configurations, and map them to hardware and software inventory at a designated recovery location while reducing, or minimizing, the need for human intervention. This process reduces or minimizes the burden of reconfiguring hardware and software at the recovery center, and can be effectively used to reduce a process that formerly took days down to hours.

More specifically, the present invention uses a resource definition language for the expression of requirements for computer systems and associated networking and peripherals. The resource definition language is used by the customer to specify a complete recovery instruction, from process definition, system control program information, peripheral requirements, networking information, channel extension capabilities, and tape vaulting information in a common descriptive system. This specification preferably is analyzed and processed automatically, enabling included programs and processes to automatically assign resource at the recovery site and reconfigure the environment.

This invention allows complete control of specifications (including networking, channel extension, esoteric device names, console addresses and tape inventory control) as well as rapid (within minutes) evaluation of the disaster recovery test event or actual recovery processing.

The present invention may be used to analyze, map, reconfigure recovery hardware and begin restoration of a customer to a hot-site recovery configuration in a matter of minutes. In addition, the invention may be linked directly to director switching technology to automate the assignment of device after selection has been made.

Figure 1:
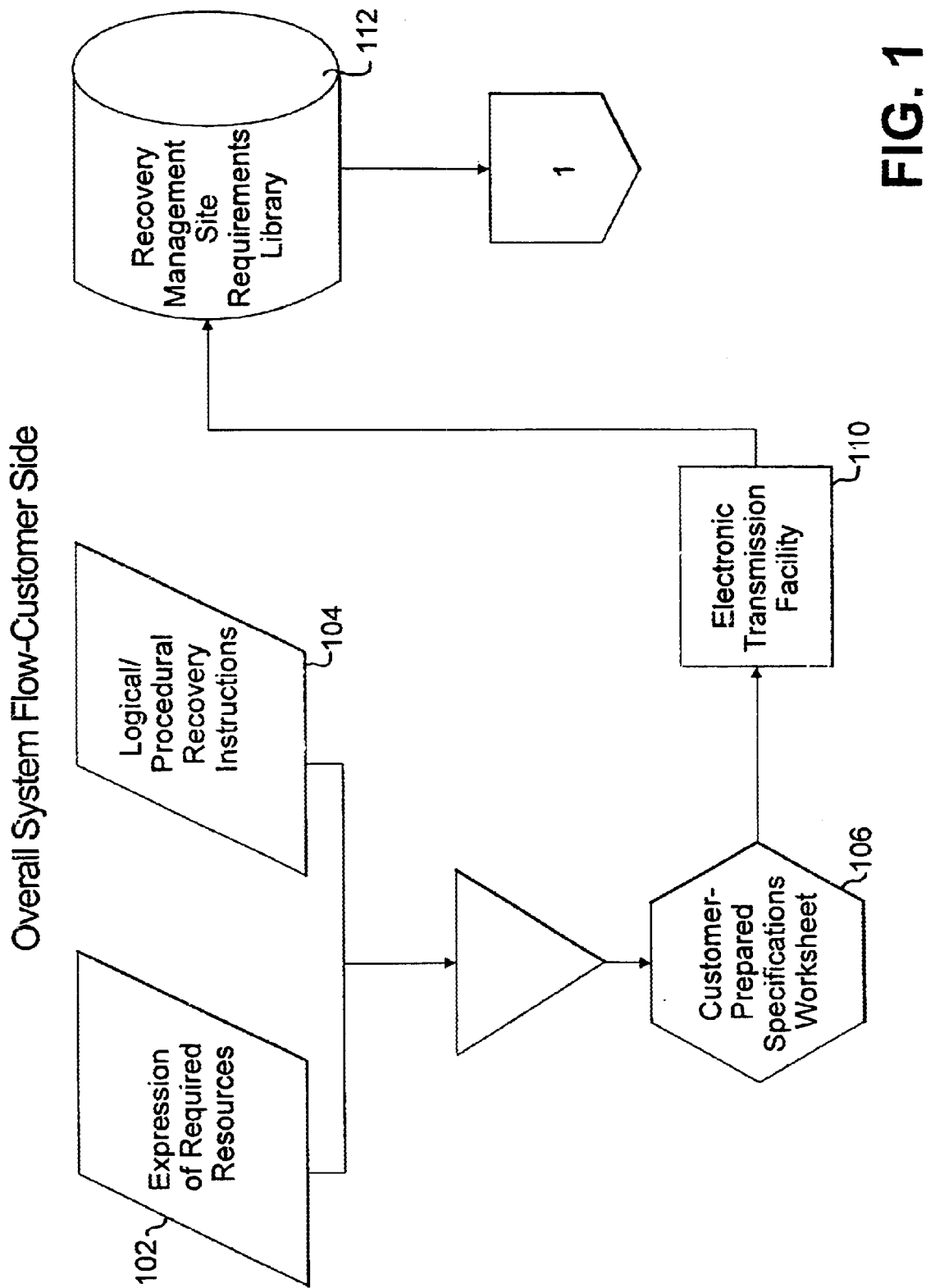
FIG. 1 is a flow chart illustrating a first, customer side part of a method embodying the present invention.

In the implementation of the present invention, with reference to FIG. 1, as represented at 102 and 104, the customer inputs an expression of resources and logical/procedural recovery instructions. From the customer input data, a customer proposed worksheet 106 is prepared and electronically transmitted 110 to the recovery management site requirement library 112.

Figure 2:
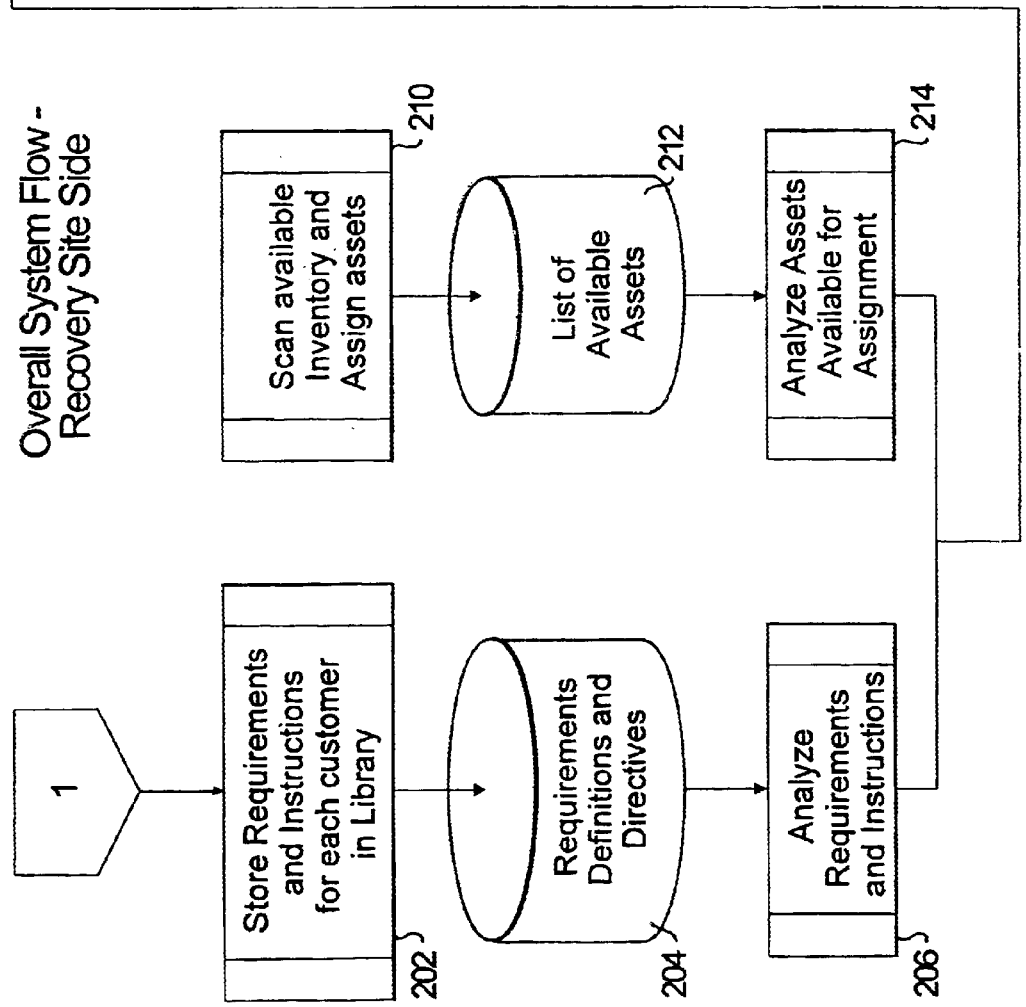
FIG. 2 shows a second, recovery side part of the method.

At the recovery site, with reference to FIG. 2, requirements and instructions for each customer are stored in a library 202, along with requirements definitions and directives 204, and the customer requirements and instructions are analyzed 206. Also, a scan is performed of available inventory and assign assets 210, a list of available assets 212 is made, and assets available for assignment are analyzed 214. Then, as represented at 216, resource and asset characteristics is made, instructions are generated at 220 to reconfigure assets to match requirements, and recovery 222 is performed using reconfigured assets.

Figure 3:
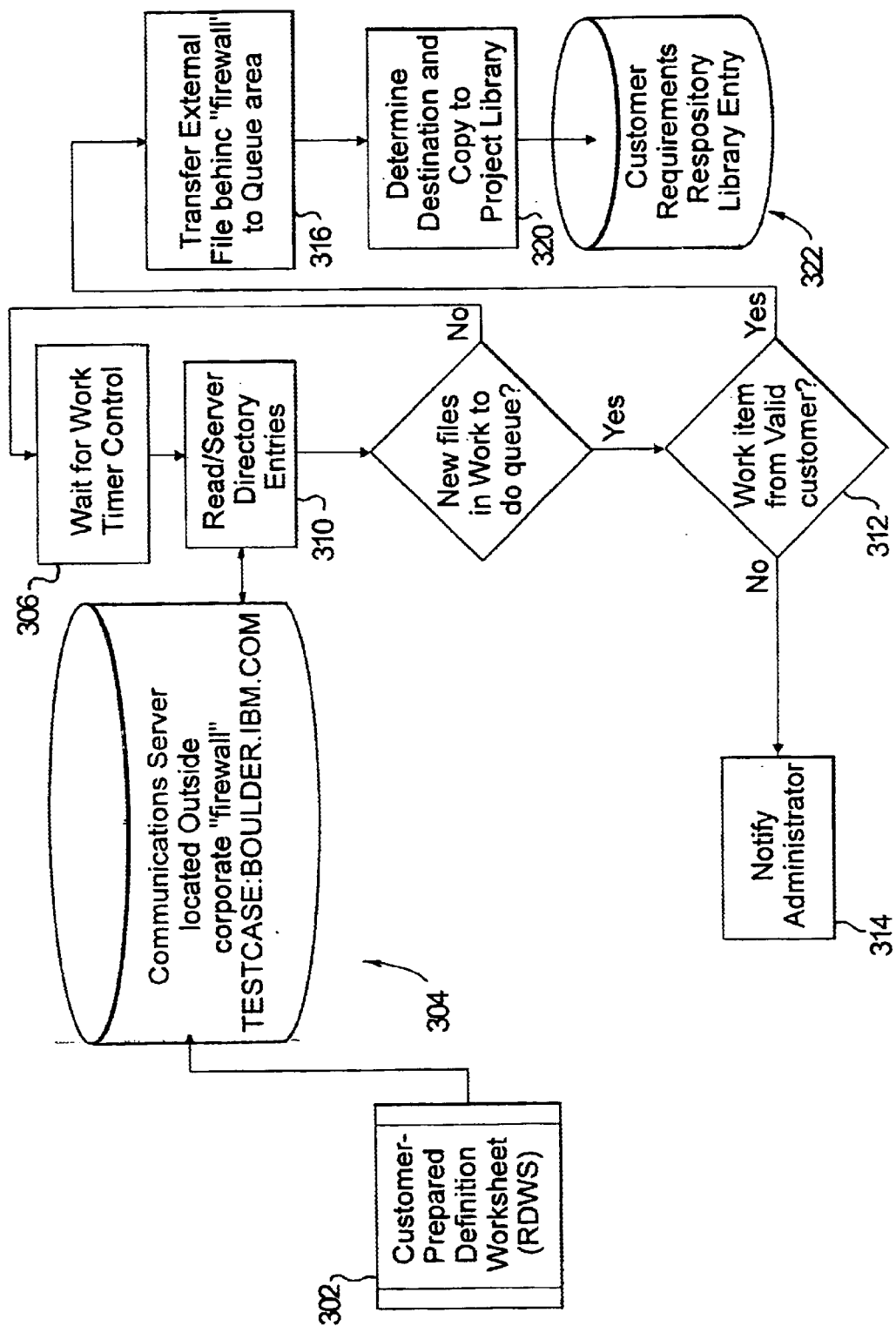
FIG. 3 illustrates a particular task that is used in the preferred embodiment of this invention.

FIG. 3 illustrates a task referred to as the server getfiles task. In this task, a customer prepared definition worksheet 302 is input to a communications server 304, which serves as a firewall. When the task begins work, as represented by step 306, the server directory entries are read at step 310. If no new files are in the work to do queue, the task returns to step 306. If, however, new files are in that work to do queue, the task proceeds to step 312, where a check is made to determine if the work item is from a valid customer. If the work item is not from a valid customer, the administrator is notified at step 314.

If the work item is from a valid customer, the external file is transferred from behind the firewall to a queue area at step 316. Then, at step 320, the destination is determined, a copy is sent to the project library, and an entry is made at the customer requirements repository library at step 322.

Figure 4:
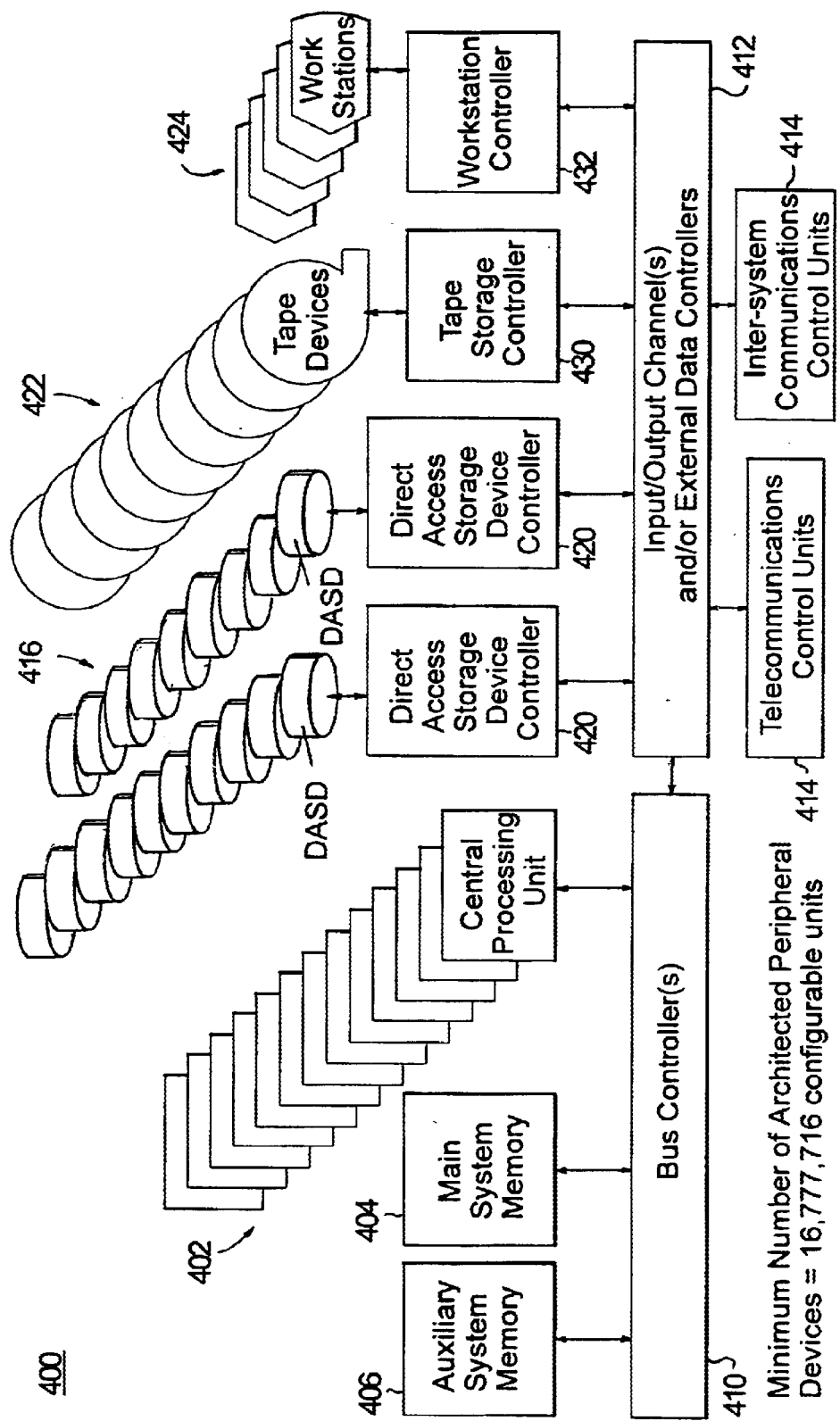
FIG. 4 diagrammatically shows a computer system that may be used to carry out the present invention.

As will be understood by those of ordinary skill in the art, the present invention may be carried out on any suitable computer or computer network. FIG. 4 illustrates, as an example, a computer system 400 of a type that may be used in the practice of this invention. The computer system includes a series of central processing units 402, which perform the calculations and logic operations required to execute programs. A main memory system 404 and an auxiliary memory system 406 constitute the memory of the computer system.

A bus 410 serves as the main information highway, interconnecting the other components of the computer system. Input/output channels 412 are connected to bus 406, and telecommunications control units 414 are, in turn, connected to I/O channels 412. A group of direct access storage devices 416 are connected to I/O channels 412 via controller 420. Similarly, tape devices 422 and work stations 424 are connected to the I/O channels via controllers 430 and 432 respectively.

For example, the present invention has been successfully reduced to practice using the resource definition language Common Entity Definition Language, which allows for the expression of requirements for the IBM Server/390 system. Appendices A-Q describe this reduction to practice in detail. In particular, Appendices A and B are documentation user and documentation customer manuals, and Appendix C describes the Common Entity Definition Language. Appendices D, E, F and G are the source code for tasks referred to, respectively, as AMFSGT—Server Get Task, BRSRDSCH—Read Scheduler, MJF Autoconfig GEN (VM), and GETIOCP Library Control. Appendices H, I and J are the source code for MJFJFR Preprocessor RDWS, MJFMCM multicriteria match, and MJFSDC summarizer. Appendices K, L and M are the source code for tasks SCRAMIEE—execution shell, SCRAMIEE Profile, and conversion aid MJFAIS analyze IOCP. Appendices N, O, P and Q are the source codes for conversion aids MJFALD align data filter, MJFALI align input filter, MJFGAID and MGFPAIM.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for enabling high-speed recovery and automation of computer workloads, comprising the steps:
    expressing requirements for a computer system and associated networking and peripherals, said computer system having a given workload;
    allowing a customer to specify a recovery instruction for the computer system;
    processing the recovery instruction at a recovery site; and
    using a computer to process the recovery instruction to assign resources at the recovery site to reconstruct the computer system to enable relocation of the workload of the computer system on said reconstructed computer system.

2. A method according to claim 1, wherein the expressing step includes the step of using a resource definition language to express the requirement of the computer system.

3. A method according to claim 1, wherein the recovery instruction includes process definitions, system control program information, peripheral requirements, networking information, channel extension capabilities and tape vaulting information.

4. A method according to claim 1, wherein the step of using the computer includes the step of using the computer to analyze, map, reconfigure recovery hardware and begin restoration of the customer to a recovery configuration.

5. A method according to claim 1, wherein the step of using the computer includes the step of reconstructing the computer system at said recovery site.

6. A system for enabling high-speed recovery and automation of computer workloads, comprising:
    means for expressing requirements for a computer system and associated networking and peripherals, said computer system having a given workload;
    means for allowing a customer to specify a recovery instruction for the computer system;
    means for processing the recovery instruction at a recovery site; and
    a computer to process the recovery instruction to assign resources at the recovery site to reconstruct the computer system to enable relocation of the workload of the computer system on said reconstructed computer system.

7. A system according to claim 6, wherein the expressing means includes means for using a resource definition language to express the requirement of the computer system.

8. A system according to claim 6, wherein the recovery instruction includes process definitions, system control program information, peripheral requirements, networking information, channel extension capabilities and tape vaulting information.

9. A system according to claim 6, wherein the computer includes means to analyze, map, reconfigure recovery hardware and begin restoration of the customer to a recovery configuration.

10. A system according to claim 6, wherein the computer reconstructs the computer system at said recovery site.

11. A program storage device readable by machine, tangibly embodying a program of instructions executable by the machine for performing method steps for enabling high-speed recovery and automation of computer workloads, said method steps comprising:
    expressing requirements for a computer system and associated networking and peripherals, said computer system having a given workload;

allowing a customer to specify a recovery instruction for the computer system;

processing the recovery instruction at a recovery site; and using a computer to process the recovery instruction to assign resources at the recovery site to reconstruct the computer system.

12. A program storage device according to claim 11, wherein the expressing step includes the step of using a resource definition language to express the requirement of the computer system.

13. A program storage device according to claim 11, wherein the recovery instruction includes process definitions, system control program information, peripheral requirements, networking information, channel extension capabilities and tape vaulting information.

14. A program storage device according to claim 11, wherein the step of using the computer includes the step of using the computer to analyze, map, reconfigure recovery hardware and begin restoration of the customer to a recovery configuration.

15. A program storage device according to claim 11, wherein the step of using the computer includes the step of reconstructing the computer system at said recovery site.

* * * * *